(12) United States Patent
Kitamura et al.

(10) Patent No.: US 7,291,807 B2
(45) Date of Patent: Nov. 6, 2007

(54) TIG WELDING EQUIPMENT AND TIG WELDING METHOD

(75) Inventors: Kaoru Kitamura, Utsunomiya (JP); Naoji Yamaoka, Sayama (JP); Shigeru Tanimizu, Sayama (JP); Keiichi Shimazaki, Kawagoe (JP); Hirofumi Morita, Chiba (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/513,958

(22) PCT Filed: May 8, 2003

(86) PCT No.: PCT/JP03/05744

§ 371 (c)(1),
(2), (4) Date: May 25, 2005

(87) PCT Pub. No.: WO03/095135

PCT Pub. Date: Nov. 20, 2003

(65) Prior Publication Data

US 2006/0124603 A1 Jun. 15, 2006

(30) Foreign Application Priority Data

May 13, 2002  (JP)  ............... 2002-137575
May 13, 2002  (JP)  ............... 2002-137618

(51) Int. Cl.
*B23K 9/12* (2006.01)

(52) U.S. Cl. .................... 219/125.12; 219/75

(58) Field of Classification Search ............... 219/107, 219/93, 119, 121.11, 76.1, 74, 130.1, 12, 219/54, 61, 75, 76.14, 124.34, 125.1, 125.12; 228/45

See application file for complete search history.

(56) References Cited

U.S. PATENT DOCUMENTS

| 1,676,985 | A | * | 7/1928 | Haughton | 219/125.12 |
| 1,751,077 | A | * | 3/1930 | Ardenne et al. | 219/124.22 |
| 4,532,406 | A | * | 7/1985 | Povlick et al. | 219/124.34 |
| 4,532,409 | A | * | 7/1985 | Ogata et al. | 219/137 R |
| 4,664,587 | A | * | 5/1987 | Case et al. | 414/680 |
| 5,066,848 | A | * | 11/1991 | Nishikawa et al. | 219/124.34 |
| 5,171,966 | A | * | 12/1992 | Fukuoka et al. | 219/125.12 |
| 5,512,726 | A | * | 4/1996 | Arantes et al. | 219/125.1 |
| 5,614,116 | A | * | 3/1997 | Austin et al. | 219/130.21 |
| 5,789,717 | A | * | 8/1998 | Imaizumi et al. | 219/75 |
| 5,864,115 | A | * | 1/1999 | Ikeda et al. | 219/130.21 |
| 6,175,093 | B1 | * | 1/2001 | Cauthon et al. | 219/76.14 |
| 6,407,364 | B1 | * | 6/2002 | Mumaw | 219/125.12 |
| 6,610,958 | B2 | * | 8/2003 | Stricklen | 219/75 |

FOREIGN PATENT DOCUMENTS

GB       1 568 790       *  6/1980

(Continued)

*Primary Examiner*—Kevin P. Kerns
(74) *Attorney, Agent, or Firm*—Birch, Stewart, Kolasch & Birch, LLP (57) ABSTRACT

TIG welding equipment includes a first articulate robot having a first arm, a TIG torch holding member for holding a TIG torch at a specified position so that the TIG torch can perform a weaving operation, and a filler wire guide moving member formed so as to surround the TM torch holding member and holdingly moving a filler wire guide in Z-axis direction.

10 Claims, 7 Drawing Sheets

FOREIGN PATENT DOCUMENTS

| | | | |
|---|---|---|---|
| JP | 61-165276 A | * | 7/1986 |
| JP | 2-148781 U | | 12/1990 |
| JP | 06-198445 A | | 7/1994 |
| JP | 08-039252 A | | 2/1996 |
| JP | 2500207 B2 | | 3/1996 |
| JP | 08-187579 A | | 7/1996 |
| JP | 8-243747 A | | 9/1996 |
| JP | 11-129071 A | | 5/1999 |
| JP | 2001-71286 A | | 3/2001 |
| JP | 2001-138054 A | | 5/2001 |
| JP | 2002-361421 A | | 12/2002 |

* cited by examiner

TIG WELDING EQUIPMENT AND TIG WELDING METHOD

TECHNICAL FIELD

The present invention relates to a TIG welding apparatus and a TIG welding method for performing a TIG welding process on a surface of a workpiece while supplying a filler wire from a filler wire guide to a space to generate an arc therein between a TIG torch and the workpiece, thereby forming a bead on the surface of the workpiece.

BACKGROUND ART

Heretofore, there is known a TIG welding process for supplying a filler wire to a space to generate an arc therein between a TIG torch and a workpiece, thereby forming a bead on a surface of the workpiece.

For example, motorcycle frames include a thin workpiece and a thick workpiece, which are made of aluminum or aluminum alloy, that overlap each other to provide a weld region. Then, a TIG welding process is performed on the weld region to form a scale-like bead in the weld region, joining the two workpieces.

The TIG welding process for the two workpieces requires much more heat energy to be consumed than a process of welding workpieces made of iron or the like.

The motorcycle frames are disposed in positions which attract public attention. Therefore, the quality of the scale-like bead governs the customer attraction capability of the motorcycle frames.

For this reason, the motorcycle frames are TIG-welded by skilled technicians of the TIG welding process.

It is not easy to hand down the TIG welding techniques from the skilled technicians to general welding technicians. Further, it is difficult to increase the production efficiency of motorcycle frames even when the skilled technicians perform the TIG welding process.

Attempts have been made to cause an articulated robot to perform the TIG welding process which has been performed by the skilled technicians, thus increasing the frame production efficiency.

In such an articulated robot, a TIG torch and a filler wire guide are held by an arm of the articulated robot, and a filler wire is supplied from the filler wire guide to a space defined between the TIG torch and a weld region of two workpieces. The TIG torch is oscillated in a weaving action for performing a TIG welding process.

However, when the TIG torch makes a weaving action, a position of the TIG torch and a position of the filler wire with respect to the surfaces of the two workpieces vary. Therefore, the amount of the filler wire which is required to form the bead varies. Therefore, when the bead is formed, the state of the molten well of the filler wire that is formed in the weld region becomes unstable, forming a faulty bead. The faulty bead reduces the customer attraction capability of the motorcycles.

DISCLOSURE OF THE INVENTION

It is an object of the present invention to provide a TIG welding apparatus and a TIG welding method which are capable of forming a favorable scale-like bead on the surface of a workpiece using an articulated robot.

According to the present invention, a TIG welding apparatus performs a TIG welding process on a surface of a workpiece while supplying a filler wire from a filler wire guide to a space to generate an arc therein between a TIG torch and the workpiece, thereby forming a bead on the surface of the workpiece, the TIG welding apparatus having an articulated robot for causing the TIG torch to make a weaving action to move toward and away from the surface of the workpiece while causing the TIG torch to follow the surface of the workpiece, and a filler wire guide moving means held by the articulated robot, for moving the filler wire guide toward and away from the surface of the workpiece.

The TIG welding process, which has heretofore been performed with a filler wire guide held by one hand of a skilled technician and a TIG torch held by the other hand thereof, is carried out by the articulated robot which has the TIG torch and the filler wire guide. Therefore, the TIG welding process which has been performed by the skilled technician can be automatized to increase the production efficiency of products that are produced by the TIG welding process.

As the filler wire guide can be moved in a predetermined direction by the filler wire guide moving means, the filler wire can stably be supplied to the space to generate the arc therein regardless of the weaving action that is being made by the TIG torch.

If the filler wire guide moving means has a rotating and linearly moving mechanism, then the filler wire guide can be moved in the predetermined direction.

The rotating and linearly moving mechanism allows the filler wire guide to move opposite to the weaving action of the TIG torch, so that the filler wire guide can have a constant apparent height with respect to the surface of the workpiece.

The above motion of the filler wire guide does not make unstable the molten well of the filler wire on the surface of the workpiece. Therefore, a favorable bead with a high customer attraction capability can easily be obtained.

According to the present invention, a TIG welding method performs a TIG welding process on a surface of a workpiece while supplying a filler wire from a filler wire guide to a space to generate an arc therein between a TIG torch held by an arm of an articulated robot and the workpiece, thereby forming a bead on the surface of the workpiece, the TIG welding method being characterized by causing the TIG torch to make a weaving action to move toward and away from the surface of the workpiece while causing the TIG torch to follow the surface of the workpiece, and moving the filler wire guide in a direction opposite to the weaving action of the TIG torch.

By performing the TIG welding process on the workpiece while moving the filler wire guide in a direction opposite to the weaving action of the TIG torch, the apparent height of the filler wire guide with respect to the surface of the workpiece is made constant. In this manner, during the TIG welding process, the filler wire can stably be supplied to the space to generate the arc therein. Accordingly, the molten well of the filler wire on the surface of the workpiece is not made unstable. Therefore, a favorable bead with a high customer attraction capability can easily be obtained.

The filler wire guide is held on the arm of the articulated robot by the filler wire guide moving means, and the TIG torch is held on the arm of the articulated robot by the TIG torch holding means. When the filler wire guide moving means moves in a certain direction, the filler wire guide is moved. When the articulated robot moves in a certain direction, the TIG torch makes the weaving action. When the articulated robot moves along the surface of the workpiece, the TIG torch follows the surface of the workpiece.

Since the arm of the articulated robot holds the TIG torch and the filler wire guide, causes the TIG torch to make the weaving action with respect to the surface of the workpiece and follow the surface of the workpiece, and also causes the filler wire guide to move in a certain direction with respect to the surface of the workpiece, the TIG welding process, which has heretofore been performed by a skilled technician is automatized, thus increases the production efficiency of products that are produced by the TIG welding process.

According to the present invention, a TIG welding apparatus performs a TIG welding process on a surface of a workpiece while supplying a filler wire from a filler wire guide to a space to generate an arc therein between a TIG torch and the workpiece, thereby forming a bead on the surface of the workpiece, the TIG welding apparatus being characterized by a TIG torch moving means held by an arm of an articulated robot, for causing the TIG torch to make a weaving action to move toward and away from the surface of the workpiece, and a filler wire guide holding means for holding the filler wire guide on the arm of the articulated robot.

Inasmuch as the TIG welding process, which has heretofore been performed with a filler wire guide held by one hand of a skilled technician and a TIG torch held by the other hand thereof, is carried out by the articulated robot which has the TIG torch and the filler wire guide, the TIG welding process which has been performed by the skilled technician can be automatized to increase the production efficiency of products that are produced by the TIG welding process.

As the filler wire guide is held by the filler wire guide holding means, the position of the filler wire with respect to the surface of the workpiece can be held constant. Therefore, the filler wire can stably be supplied to the space to generate the arc therein. Consequently, the molten well of the filler wire on the surface of the workpiece is not made unstable.

The TIG torch moving means causes the TIG torch to make a weaving action in directions to move toward and away from the surface of the workpiece. The weaving action makes it possible to form a favorable scale-like bead on the surface of the workpiece, resulting in an increased customer attraction capability.

The TIG torch moving means may employ a rotating and linearly moving mechanism to cause the TIG torch to make the weaving action.

According to the present invention, a TIG welding method performs a TIG welding process on a surface of a workpiece while supplying a filler wire from a filler wire guide to a space to generate an arc therein between a TIG torch held by an arm of an articulated robot and the workpiece, thereby forming a bead on the surface of the workpiece, the method being characterized by causing the TIG torch to make a weaving action to move toward and away from the surface of the workpiece while causing the arm of the articulated robot to follow the surface of the workpiece.

Since the TIG torch makes the weaving action with respect to the surface of the workpiece and follows the surface of the workpiece, a favorable bead with a high customer attraction capability can easily be obtained.

The filler wire guide is held on the arm of the articulated robot by the filler wire guide holding means, and the TIG torch is held on the arm of the articulated robot by the TIG torch moving means. When the TIG torch moving means moves in a certain direction, the TIG torch makes the weaving action. When the arm of the articulated robot moves along the surface of the workpiece, the TIG torch follows the surface of the workpiece.

Since the arm of the articulated robot holds the filler wire guide, and causes the TIG torch to make the weaving action with respect to the surface of the workpiece and follow the surface of the workpiece, the filler wire is stably supplied to the space to generate the arc therein during the TIG welding process. Therefore, the molten well of the filler wire on the surface of the workpiece is not made unstable.

The TIG welding process that has heretofore been performed by a skilled technician is automatized, thus increasing the production efficiency of products that are produced by the TIG welding process.

BEST MODE FOR CARRYING OUT THE INVENTION

Figure 1:
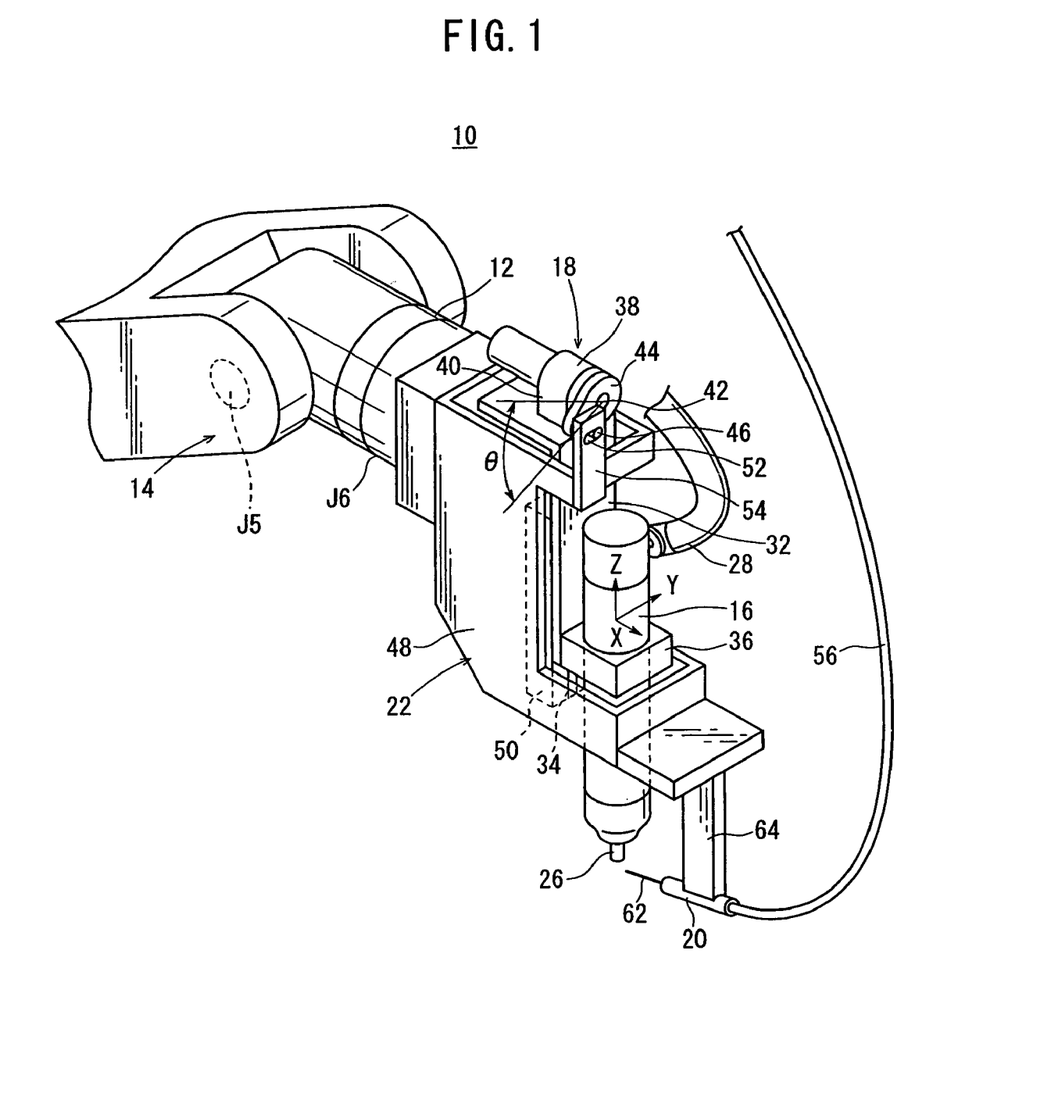
FIG. 1 is a perspective view of a TIG welding apparatus according to an embodiment of the present invention.

As shown in FIG. 1, a TIG welding apparatus 10 according to an embodiment of the present invention has a first articulated robot 14 having a first arm 12 and being operable to move the first arm 12 in any desired direction; a TIG torch holding means 18 mounted on the first arm 12 for holding a TIG torch 16 in a desired position; and a filler wire guide moving means 22 mounted on the first arm 12 in surrounding relation to a portion of the TIG torch holding means 18, for holding a filler wire guide 20 and moving the filler wire guide 20 in a direction (Z-axis direction) toward and away from a workpiece.

Figure 2:
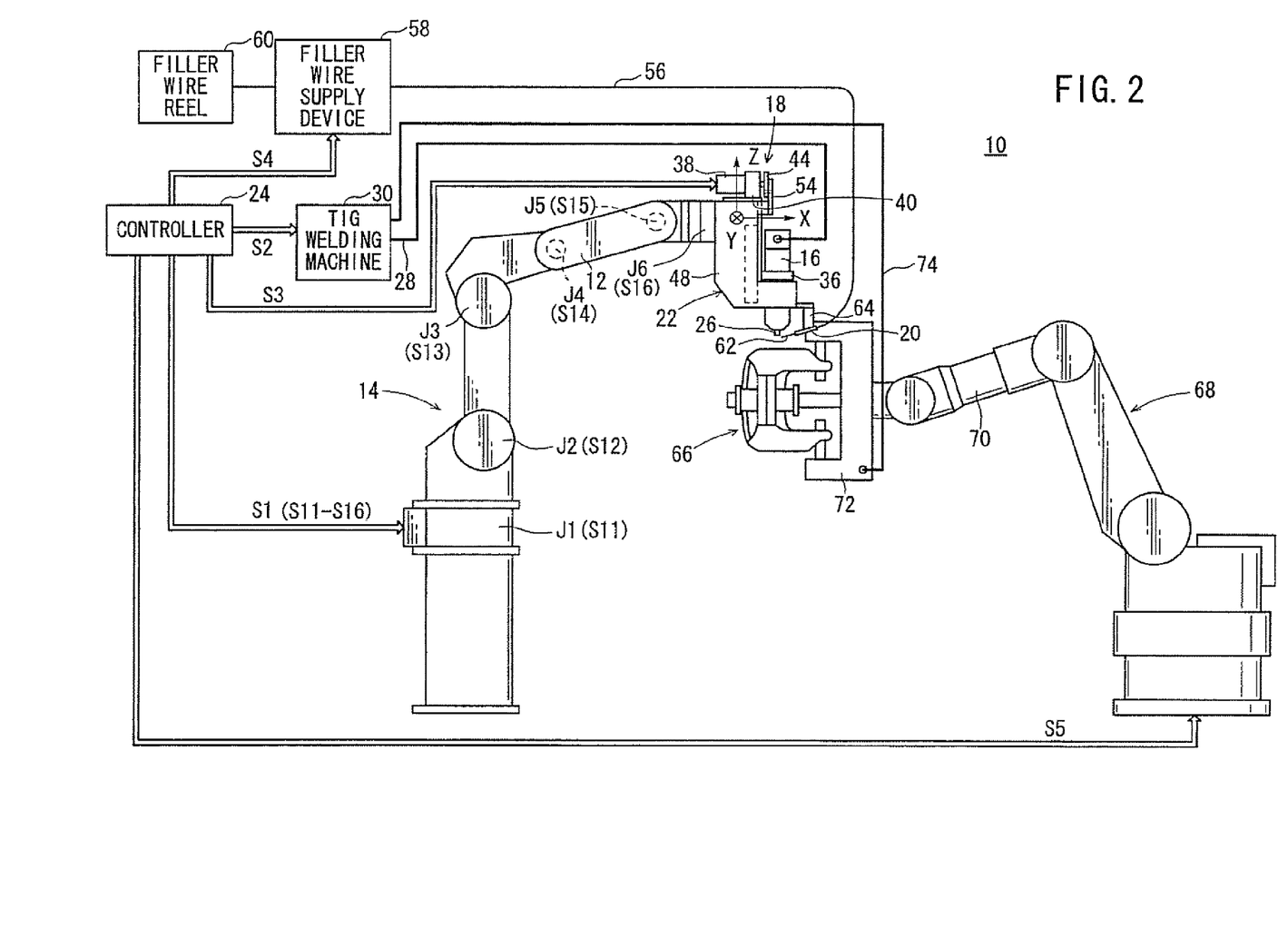
FIG. 2 is a front elevational view of the TIG welding apparatus according to the embodiment.

As shown in FIG. 2, a controller 24 transmits a first control signal S1 to the first articulated robot 14 to move the first arm 12 in any desired direction. The first articulated robot 14 has six axes J1-J6. The first control signal S1 includes control signals S11-S16 for the respective axes J1-J6.

The TIG torch 16 has a tungsten electrode 26 on its distal end. The tungsten electrode 26 is supplied with an alternating current up to several hundreds ampere from a TIG welding machine 30 through a first cable 28. The alternating current is applied to the tungsten electrode 26 when the controller 24 transmits a second control signal S2 to the TIG welding machine 30. When the alternating current is applied to the tungsten electrode 26, the TIG torch 16 starts a TIG welding process.

As shown in FIG. 1, the TIG torch holding means 18 has a fixed frame 32 held by the first arm 12 of the first articulated robot 14, and a guide rail 34 fixedly mounted in the fixed frame 32 and extending in the Z-axis direction.

The TIG torch holding means 18 also has a first holder 36 fixed to the fixed frame 32 and holding the TIG torch 16, a second holder 40 fixed to an upper portion of the fixed frame 32 and holding a servomotor 38, and a cam 44 mounted on a rotational shaft 42 of the servomotor 38.

The cam 44 should preferably be a plate cam having a tip end. A rod 46 is secured to the tip end of the cam 44 and projects from a planar surface of the cam 44.

The filler wire guide moving means 22 comprises a movable frame 48 and a slide member 50 fixedly mounted in the movable frame 48 for movement along the guide rail 34.

A restraint member 54 having a horizontally elongate slot 52 defined therein projects from an upper portion of the movable frame 48. The rod 46 projecting from the cam 44 is inserted in the slot 52.

The filler wire guide moving means 22 is thus held by the TIG torch holding means 18 via the slide member 50 and the restraint member 54.

As shown in FIG. 2, the filler wire guide 20 is connected to a filler wire supply device 58 via a filler wire guide tube 56. When the controller 24 transmits a fourth control signal S4 to the filler wire supply device 58, the filler wire supply device 58 supplies a filler wire 62 wound around a filler wire reel 60 through the filler wire guide tube 56 to the filler wire guide 20. As shown in FIG. 1, the filler wire guide 20 is held by a joint member 64 that is fixed to a lower portion of the movable frame 48.

Motion of the filler wire guide 20 at the time the controller 24 supplies a third control signal S3 to the servomotor 38 will be described below with reference to FIGS. 1 and 2.

When the third control signal S3 is transmitted to the servomotor 38, the rotational shaft 42 of the servomotor 38 turns in oscillation within the range of an angle θ, as shown in FIG. 1. Based on this movement, the tip end of the cam 44 reciprocates in the Z-axis directions within the range of the angle θ.

At this time, the rod 46 is restrained by the slot 52 in the restraint member 54. Therefore, the reciprocating movement of the cam 44 in the Z-axis directions is transmitted to the restraint member 54 via the rod 46, causing the slide member 50 to move in the Z-axis directions along the guide rail 34. The reciprocating movement of the cam 44 in the Z-axis directions also causes the movable frame 48 to move in the Z-axis directions. Therefore, the filler wire guide 20 is movable in the Z-axis directions based on the third control signal S3.

When a workpiece 66 is positioned closely to the TIG torch 16 of the TIG welding apparatus 10 according to the present embodiment, as shown in FIG. 2, the workpiece 66 can be TIG-welded.

The workpiece 66 is gripped by a frame holder 72 mounted on a second arm 70 of a second articulated robot 68. The controller 24 transmits a fifth control signal S5 to the second articulated robot 68 so that the second arm 70 operates to move and position the workpiece 66 relatively closely to the TIG torch 16. The TIG welding machine 30 and the frame holder 72 are connected to each other via a second cable 74 serving as a ground line.

Figure 3:
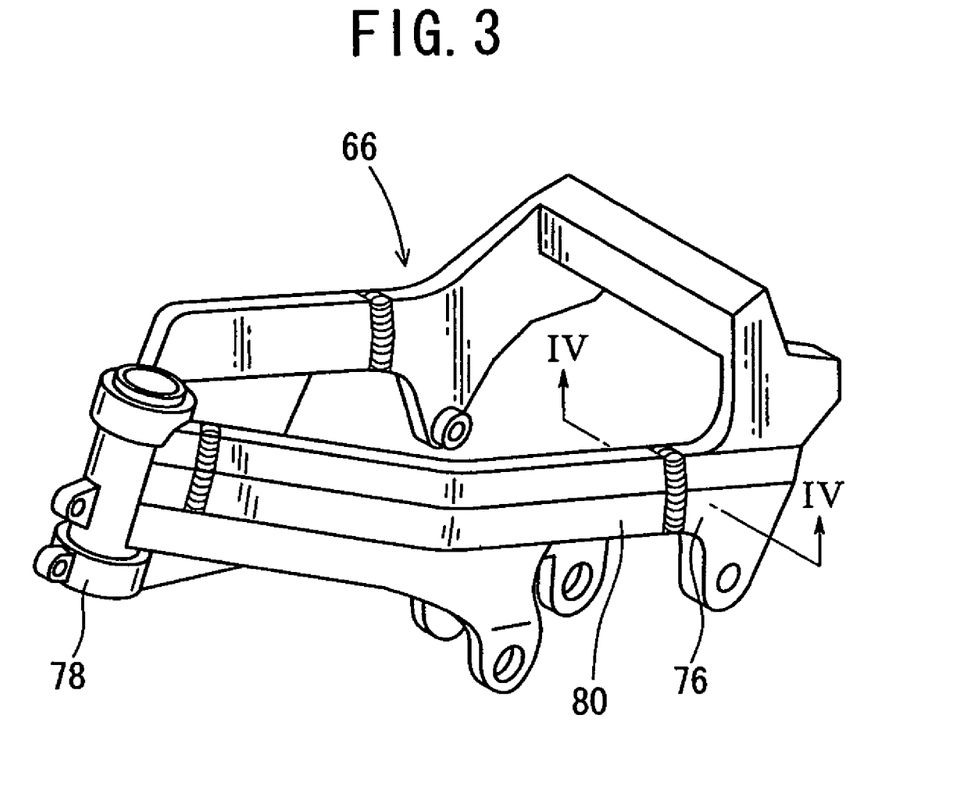
FIG. 3 is a perspective view of a workpiece on which a TIG welding process is performed.

Using the TIG welding apparatus 10 according to the present embodiment, the workpiece 66, which may be constructed as shown in FIG. 3, can be TIG-welded into an aluminum frame for a motorcycle body.

The workpiece 66 comprises first and second castings 76, 78 and a main pipe 80.

Figure 4:
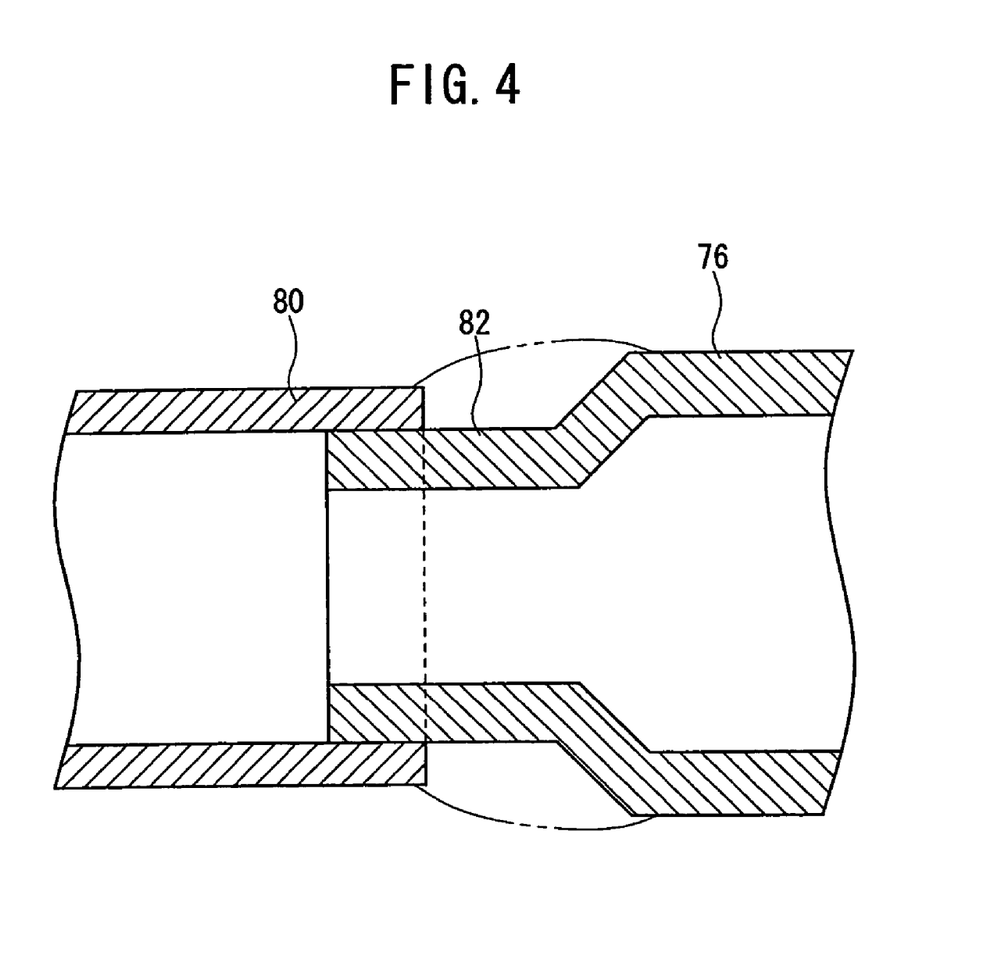
FIG. 4 is a cross-sectional view taken along line IV-IV across the workpiece shown in FIG. 3.

For producing the aluminum frame, a portion of the first casting 76 and a portion of the main pipe 80 are superposed one on the other, forming a weld region 82 as shown in FIG. 4. A portion of the second casting 78 and a portion of the main pipe 80 are superposed one on the other, forming another weld region that is different from the weld region 82.

Figure 5:
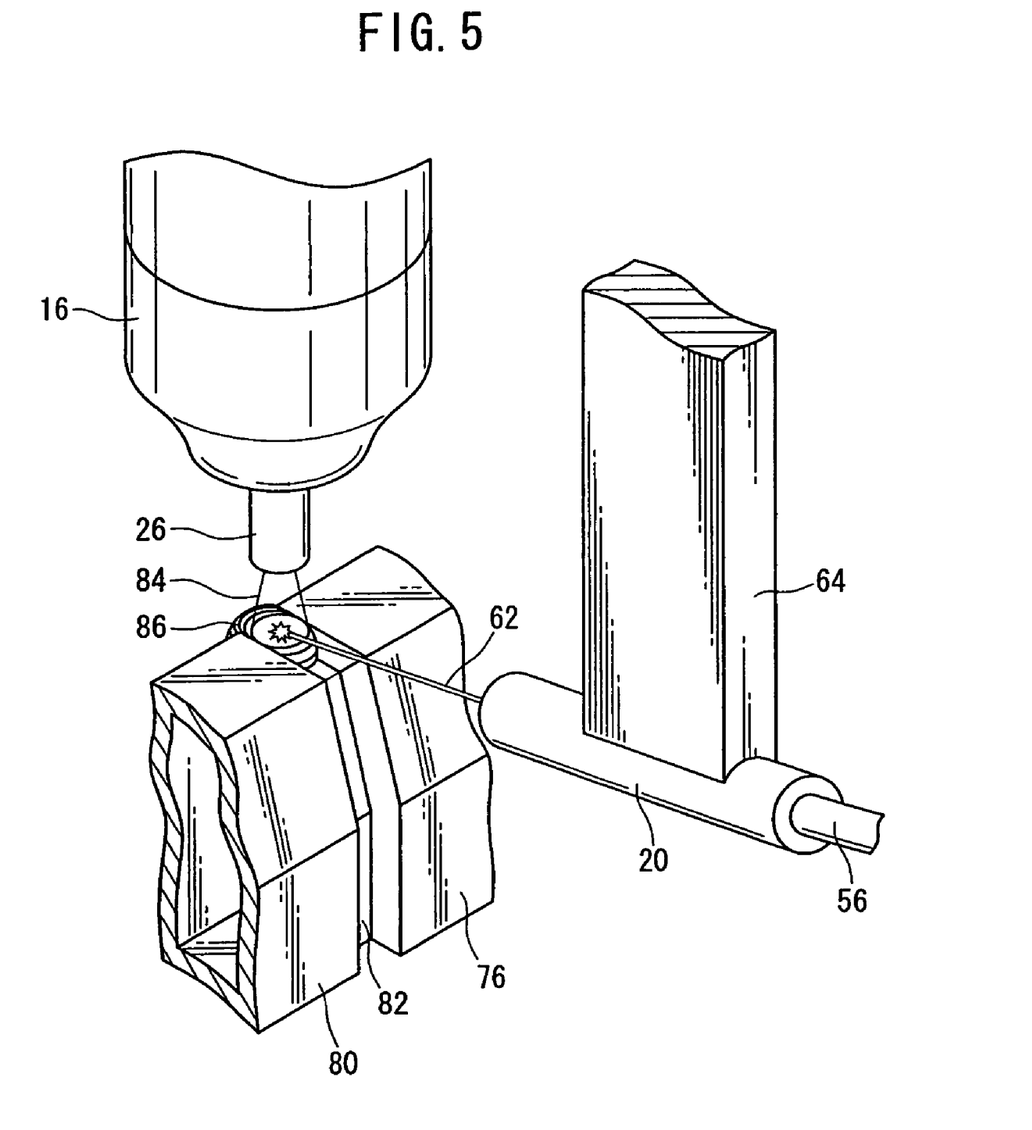
FIG. 5 is a view showing a TIG welding process on a surface of the workpiece shown in FIG. 3.

Then, the workpiece 66 is gripped by the frame holder 72. As shown in FIG. 5, the weld region 82 is positioned so as to lie along a desired direction, i.e., the X-axis direction (see FIG. 1), closely to the tungsten electrode 26 of the TIG torch 16.

Then, an alternating current is applied to the tungsten electrode 26 to generate an arc discharge in a space 84 defined between the weld region 82 and the tungsten electrode 26. The filler wire 62 is supplied from the filler wire guide 20 into the space 84.

At this time, as shown in FIG. 1, since the cam 44 reciprocates in the Z-axis directions based on the oscillation of the rotational shaft 42, the filler wire guide moving means 22 can move the filler wire guide 20 in the Z-axis directions.

The first articulated robot 14 is supplied with the first control signal S1 from the controller 24. When the control signal S15 of the first control signal S1 is transmitted to the axis J5, the first arm 12 of the first articulated robot 14 oscillates in the Z-axis directions. Since the oscillation of the first arm 12 is transmitted to the TIG torch holding means 18, the TIG torch 16 makes a weaving action to oscillate toward and away from the weld region 82 of the workpiece 66.

The weaving action of the TIG torch 16 is controlled to move opposite to the oscillation of the filler wire guide 20. This weaving action of the TIG torch 16 allows the filler wire guide 20 to have an apparent height that is constantly kept as a predetermined height with respect to the weld region 82 of the workpiece 66. Therefore, the filler wire 62 can stably be supplied to the space 84.

The weaving action of the TIG torch 16 and the stable supply of the filler wire 62 from the filler wire guide 20 to the space 84 make it possible to form a favorable scale-like bead 86 in the weld region 82.

When the TIG torch 16 makes a weaving action while the first arm 12 of the first articulated robot 14 is moving in the X-axis direction, a plurality of scale-like beads 86 are formed in partly overlapping relation along a straight path.

The aluminum frame with the scale-like beads 86 thus formed for use on a motorcycle will attract public attention because it will be positioned on a side of the rider's seat of the motorcycle. Therefore, if the aluminum frame with the scale-like beads 86 formed by the TIG welding apparatus 10 according to the present embodiment is used as an aluminum frame for a motorcycle, then it increases the customer attraction capability of the motorcycle.

Figure 6:
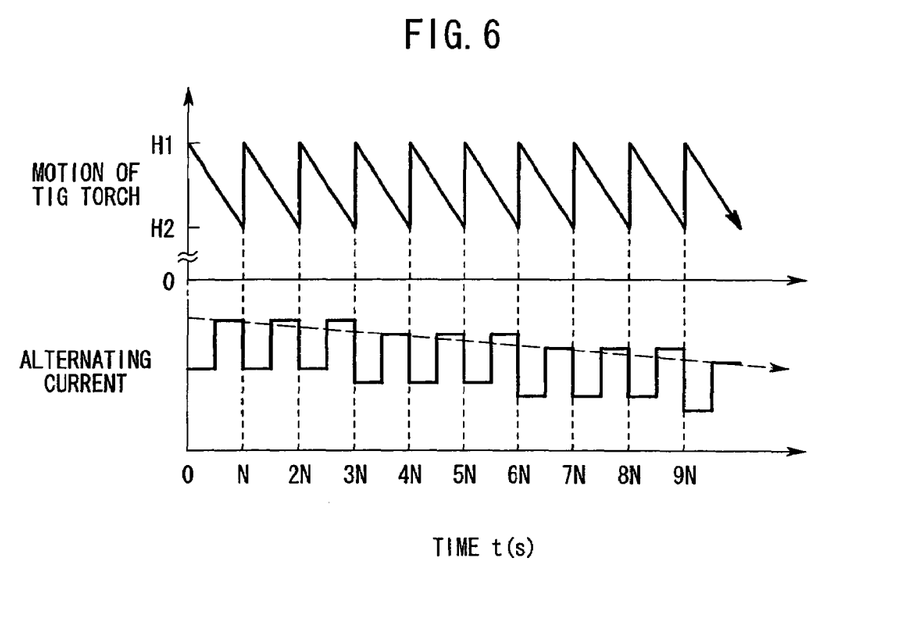
FIG. 6 is a diagram showing a weaving action of a TIG torch upon the elapse of time.

The relationship between the weaving action of the TIG torch 16 in the TIG welding process performed by the TIG welding apparatus 10 according to the present embodiment, the alternating current applied to the tungsten electrode 26, and the amount of the filler wire 62 that is supplied will be described from the standpoint of the elapse of time.

As shown in FIG. 6, the TIG torch 16 makes a weaving action cyclically in periods of N. Specifically, the height of the TIG torch 16, which is initially H1, changes to H2 after 0.9N (H1>N2). That is, the tip end of the tungsten electrode 26 approaches the weld region 82 up to the height H2. Thereafter, the height of the TIG torch 16 changes from H2 to H1 within 0.1N.

The temperature of the space 84 in which the arc is generated increases as the TIG welding time t elapses. If a certain alternating current is continuously applied to the tungsten electrode 26, the workpiece 66 has its temperature increased, resulting in an increase in the amount of the filler wire 62 to be melted into the weld region 82.

The alternating current applied to the tungsten electrode 26 is reduced stepwise to change the amount of generated heat for stabilizing the beads.

Since the TIG welding apparatus 10 according to the present embodiment automatizes the TIG welding process that has been performed by the skilled worker, the production efficiency of products that are produced by the TIG welding process is greatly increased.

A modification of the TIG welding apparatus 10 according to the present embodiment will be described below.

Figure 7:
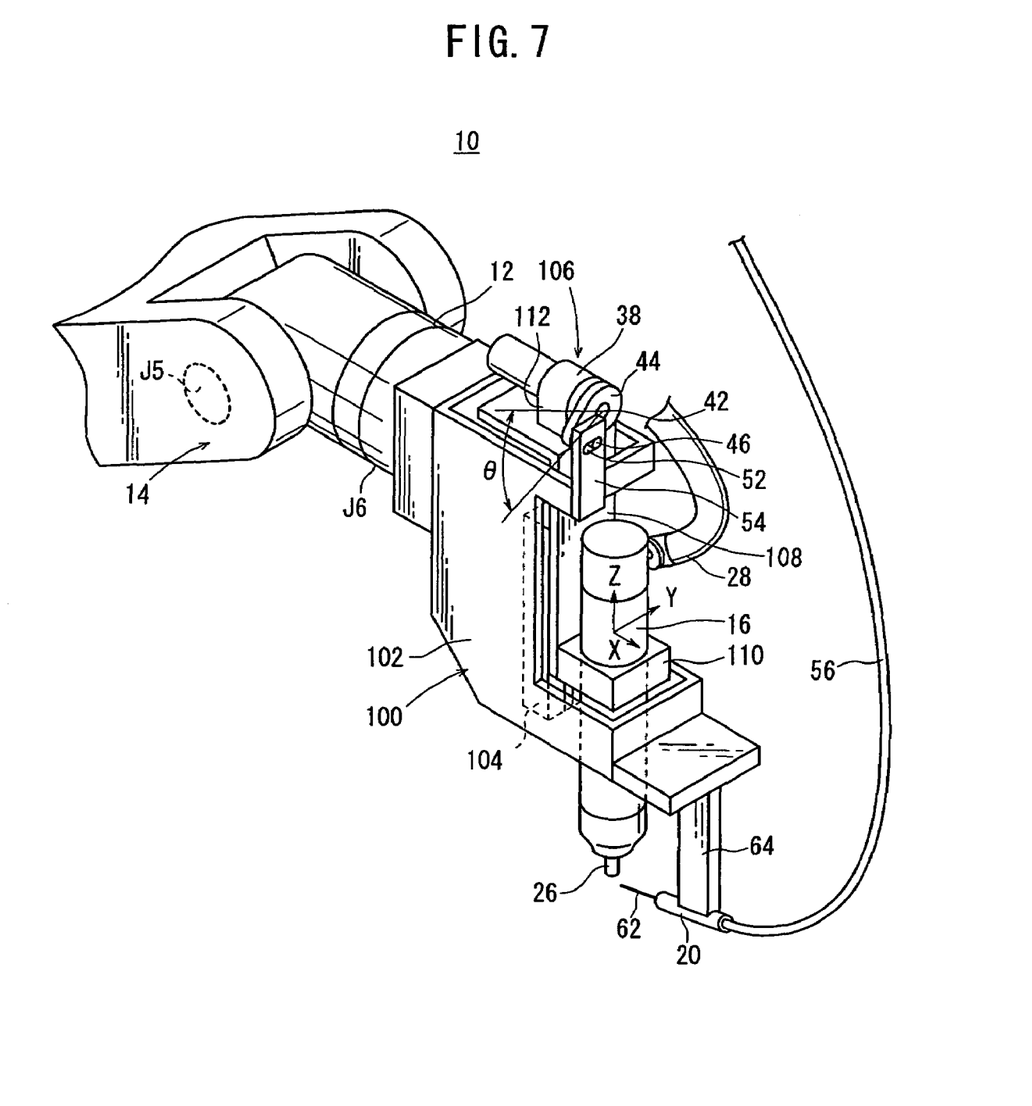
FIG. 7 is a perspective view of a modification of the TIG welding apparatus according to the embodiment.

The modification is of approximately the same structure as the TIG welding apparatus 10 shown in FIGS. 1-6, but differs therefrom as follows:

As shown in FIG. 7, a filler wire guide holding means 100 has a fixed frame 102 held by the first arm 12 of the first articulated robot 14, and a guide rail 104 fixedly mounted in the fixed frame 102 and extending in the Z-axis direction.

A TIG torch moving means 106 has a slide table 108 movable along the guide rail 104, a first holder 110 fixed to the slide table 108 and holding the TIG torch 16, a second holder 112 fixed to an upper portion of the slide table 108 and holding the servomotor 38, and the cam 44 mounted on the rotational shaft 42 of the servomotor 38.

The restraint member 54 having the horizontally elongate slot 52 defined therein projects from the upper portion of the fixed frame 102. The rod 46 is inserted in the slot 52.

The filler wire guide 20 is held by the joint member 64 that is fixed to a lower portion of the fixed frame 102.

According to the modification of the TIG welding apparatus 10, when the third control signal S3 is transmitted to the servomotor 38, the rotational shaft 42 of the servomotor 38 turns in oscillation within the range of the angle θ. Based on this movement, the tip end of the cam 44 reciprocates in the Z-axis directions within the range of the angle θ.

The reciprocating movement of the cam 44 in the Z-axis directions causes the slide table 108 to reciprocate in the Z-axis directions. Therefore, the slide table 108 can move along the guide rail 104. Therefore, the TIG torch 16 is movable in the Z-axis directions based on the third control signal S3.

As the cam 44 reciprocates in the Z-axis directions based on the oscillatory motion of the rotational shaft 42, the TIG torch moving means 106 can move the TIG torch 16 in the Z-axis directions. The TIG torch 16 makes a weaving action to oscillate toward and away from the weld region 82 of the workpiece 66.

Inasmuch as the filler wire guide 20 is held by the joint member 64, the filler wire guide 20 is constantly held in a predetermined position with respect to the weld region 82 of the workpiece 66 regardless of the weaving action of the TIG torch 16. Therefore, the filler wire 62 can stably be supplied to the space 84.

The TIG welding apparatus and the TIG welding method according to the present invention are not limited to the above embodiments, but may take various arrangements without departing from the scope of the present invention.

INDUSTRIAL APPLICABILITY

According to the present invention, as described above, since the TM torch is caused to make a weaving action and the filler wire guide is caused to move opposite to the TIG torch, the apparent height of the filler wire guide with respect to the surface of the workpiece is kept as a constant height. Therefore, the filler wire can stably be supplied to the arc generating space between the TIG torch and the surface of the workpiece, easily forming a favorable scale like bead with a high customer attraction capability on the surface of the workpiece.

According to the present invention, furthermore, the TIG torch is caused to make a weaving action and the filler wire guide is held at a constant position with respect to the surface of the workpiece. Consequently, the filler wire can stably be supplied to the arc generating space between the TIG torch and the surface of the workpiece, easily forming a favorable scale-like bead with a high customer attraction capability on the surface of the workpiece.

The invention claimed is:

1. A TIG welding apparatus for a TIG welding process on a surface of a workpiece while supplying a filler wire from a filler wire guide to a space to generate an arc therein between a TIG torch and said workpiece, thereby forming a bead on said surface of said workpiece, said TIG welding apparatus comprising:

an articulated robot for imparting movement to said TIG torch to make a weaving action to move toward and away from said surface of said workpiece; and filler wire guide moving means held by said articulated robot, said filler wire guide moving means being independently movable for moving said filler wire guide relative to the movement of said TIG torch in directions toward and away from said surface of said workpiece, wherein said filler wire guide moves in a direction opposite to said weaving action of said TIG torch and said filler wire guide is moved a predetermined distance toward and away from said surface of said workpiece while maintaining a relatively constant predetermined apparent height with respect to a weld region of the workpiece.

2. A TIG welding apparatus according to claim 1, wherein said filler wire guide moving means has a rotating and linearly moving mechanism.

3. A TIG welding method for a TIG welding process on a surface of a workpiece while supplying a filler wire from a filler wire guide to a space to generate an arc therein between a TIG torch held by an aim of an articulated robot and said workpiece, thereby forming a bead on said surface of said workpiece, comprising:

moving said TIG torch to make a weaving action to move toward and away from said surface of said workpiece for making said filler wire guide movable with respect to said TIG torch in directions toward and away from said surface of said workpiece; and independently moving said filler wire guide with respect to said TIG torch in a direction opposite to a direction of said weaving action of said TIG torch and said filler wire guide is moved a predetermined distance toward and away from said surface of said workpiece while maintaining a relatively constant predetermined apparent height with respect to a weld region of the workpiece.

4. A TIG welding apparatus for a TIG welding process on a surface of a workpiece while supplying a filler wire from a filler wire guide to a space to generate an arc therein between a TIG torch and said workpiece, thereby forming a bead on said surface of said workpiece, said TIG welding apparatus comprising:

an articulated robot for imparting movement to an arm of said articulated robot to follow said surface of said workpiece;

TIG torch moving means held by said arm of said articulated robot, for imparting movement to said TIG torch to make a weaving action to move with respect to said arm in directions toward and away from said surface of said workpiece; and filler wire guide holding means for independently holding said filler wire guide fixed on said arm of said articulated robot, said filler wire guide holding means being independently movable for moving said filler wire guide relative to the movement of said TIG torch.

5. A TIG welding apparatus according to claim 4, wherein said TIG torch moving means has a rotating and linearly moving mechanism.

6. A TIG welding method for a TIG welding process on a surface of a workpiece while supplying a filler wire from a filler wire guide to a space to generate an arc therein between a TIG torch held by an arm of an articulated robot and said workpiece, thereby forming a bead on said surface of said workpiece, comprising:

imparting movement to said TIG torch to make a weaving action to move with respect to said arm in directions toward and away from said surface of said workpiece with said filler wire guide being independently fixed on said arm of said articulated robot, while causing said arm of said articulated robot to follow said surface of said workpiece; and imparting independent movement to said filler wire guide holding means for moving said filler wile guide relative to the movement of said TIG torch.

7. A TIG welding apparatus for a TIG welding process on a surface of a workpiece while supplying a filler wire from a filler wire guide to a space to generate an arc therein between a TIG torch and said workpiece, thereby forming a bead on said surface of said workpiece, said TIG welding apparatus comprising:

an articulated robot for imparting movement to said TIG torch to make a weaving action to move toward and away from said surface of said workpiece a predetermined distance while causing said TIG torch to follow said surface of said workpiece; and filler wire guide moving means held by said articulated robot, said filler wire guide moving means moving said filler wire guide a predetermined distance toward and away from said surface of said workpiece while maintaining a relatively constant predetermined apparent height with respect to a weld region of the workpiece.

8. A TIG welding apparatus according to claim 7, wherein said filler wire guide moving means has a rotating and linearly moving mechanism.

9. A TIG welding apparatus according to claim 7, wherein said filler wire guide moves opposite to said weaving action of said TIG torch while maintaining the relatively constant predetermined apparent height with respect to the weld region of the workpiece.

10. A TIG welding method for a TIG welding process on a surface of a workpiece while supplying a filler wire from a filler wire guide to a space to generate an arc therein between a TIG torch held by an arm of an articulated robot and said workpiece, thereby forming a bead on said surface of said workpiece, comprising:

moving said TIG torch to make a weaving action to move toward and away from said surface of said workpiece a predetermined distance while causing said TIG torch to follow said surface of said workpiece; and moving said filler wire guide a predetermined distance in a direction opposite to a direction of said weaving action of said TIG torch while maintaining a relatively constant predetermined apparent height with respect to a weld region of the workpiece.

* * * * *